United States Patent [19]

Friede et al.

[11] Patent Number: 5,134,641
[45] Date of Patent: Jul. 28, 1992

[54] PLASMA X-RAY TUBE, IN PARTICULAR FOR X-RAY PREIONIZING OF GAS LASERS, AND AN ELECTRON GUN USING THE PLASMA X-RAY TUBE

[75] Inventors: Dirk Friede, Herzogenaurach; Volker Brückner, Erlangen; Rudolf Baumgartl, Alzenau-Hörstein; Hans-Jürgen Cirkel, Uttenreuth, all of Fed. Rep. of Germany

[73] Assignee: Siemens Aktiengesellschaft, Munich, Fed. Rep. of Germany

[21] Appl. No.: 594,733

[22] Filed: Oct. 9, 1990

Related U.S. Application Data

[63] Continuation of PCT/EP89/00375, Apr. 7, 1989.

[30] Foreign Application Priority Data

Apr. 8, 1988 [DE] Fed. Rep. of Germany ....... 3811817

[51] Int. Cl.$^5$ ............................................. H01J 7/24
[52] U.S. Cl. ............................... 378/122; 315/111.21; 313/231.31
[58] Field of Search .............. 378/122, 121, 119, 136; 315/138; 313/111.21, 231.31

[56] References Cited

U.S. PATENT DOCUMENTS

| | | | |
|---|---|---|---|
| 4,728,862 | 3/1988 | Kovarlik et al. | 313/231.31 |
| 4,955,045 | 9/1990 | Friede et al. | 378/119 |
| 5,007,373 | 4/1991 | Legg et al. | 315/111.21 |

*Primary Examiner*—Edward P. Westin
*Assistant Examiner*—Don Wong

*Attorney, Agent, or Firm*—Herbert L. Lerner; Laurence A. Greenberg

[57] ABSTRACT

A plasma X-ray tube, which can be referred to as a one-chamber ionizing tube for pre-ionizing TE lasers, in particular excimer lasers, includes an extended, box-like housing with a U-shaped hollow cathode which is disposed in the interior of the housing and is also elongated. The open side of the hollow electrode faces an X-ray target which is in the form of a gas-tight foil. Between the X-ray target and the hollow cathode is a long wire-shaped igniting electrode. When a positive voltage or a voltage pulse is applied to the igniting electrode, an electrical field is formed around it. Electrons that are present are forced onto a long, spiral path and gas atoms are ionized under the influence of the electrical field and because of ambient radiation. Electron avalanches form and lead to initiation of a wire discharge. When the accelerator voltage, which is typically at most between 60 kV and 120 kV, is applied to the hollow cathode low-pressure plasma, ions are extracted and accelerated against the hollow cathode. When the ions impact, secondary electrons are emitted from the hollow cathode and are accelerated in the opposite direction, so that an electron beam forms and strikes the X-ray target to generate X-ray retarding radiation. The plasma X-ray tube is fundamentally suitable as an electron gun, with a suitable electron-beam permeable configuration of a foil that covers the window opening in the target retaining wall and serves as an electron window.

29 Claims, 3 Drawing Sheets

PLASMA X-RAY TUBE, IN PARTICULAR FOR X-RAY PREIONIZING OF GAS LASERS, AND AN ELECTRON GUN USING THE PLASMA X-RAY TUBE

CROSS-REFERENCE TO RELATED APPLICATIONS:

This application is a continuation of International Application PCT/EP89/00375, filed Apr. 7, 1989.

The invention relates to a plasma X-ray tube for generating an electron beam of high electron flow density and for converting the electron beam into X-ray radiation at an X-ray target of the plasma X-ray tube. A preferred use of such a plasma X-ray tube is for the X-ray pre-ionization of gas lasers. These and other advantageous structures are described in greater detail below.

It is known that electron guns can be configured as structural elements which can be incorporated or flange-mounted onto a laser chamber that is pumped by an electrical high-voltage discharge, wherein the electron beam strikes a foil that separates the volume of the structural unit of the electron gun from that of the laser chamber, and retarding radiation that is released by the impact of the electrons on the metal foil is used for the pre-ionization of the discharge volume of the laser chamber. Reference is made in this regard to Applied Physics Letter 34 (8) of Apr. 15, 1979, pp. 505–508, by S. Lin and J. I. Levatter, entitled: "X-ray Preionisation for Electric Discharge Lasers".

The invention proceeds from the following definition of the problem: During the generation of X-ray retarding radiation for the pre-ionization of pulsed gas discharges, e.g., in the special case of a high-performance laser with a large discharge volume of, for example, $450 \times 40 \times 56$ mm$^3$, operating reliability is a matter of major importance. High electron flow densities have to be produced on a large-area radiation cross-section in order to bring about a corresponding large radiation cross-section during retardation or X-ray radiation, respectively. The X-ray pre-ionization unit must ensure reliable pulse operation with high repetition rates, and the intensity of the X-ray radiation emitted from the target rust be sufficient to provide the necessary high starting electron density for a homogeneous high-pressure glow discharge in the laser gas between the electrodes. The provision of the start electron density must take place in a narrow time window prior to the start of the main laser discharge. Field emission tubes do not meet such a requirement insofar as their service life is limited during continuous operation and at high repetition rates (rounding of the knife or cutter-shaped electrodes, and thus widely fluctuating intensity distribution of the X-ray radiation). The thermal load of the field-emission cathode leads to sputter processes, which results in the rounding of the edge.

U.S. Pat. No. 3,970,892 describes an ion plasma electron gun that operates with a starter or ignition wire and a hollow-cathode discharge in order to generate charge carriers in the plasma chamber. However, the anode that is associated with the hollow-cathode (the hollow-cathode anode) is formed as a grid that is mounted in such a way as to be insulated, and also covers the cross-section of the electron beam, in addition to an acceleration-anode grid. That configuration is also restricted with regard to electron flow density by the double grid configuration. In addition, the double-grid configuration of an accelerator grid and a grid for the hollow-cathode anode results in relatively high electrical and mechanical costs.

U.S. Pat. No. 3,831,052 describes an electron-beam generating system that operates with an ion plasma within a hollow cathode. That system can be converted to an ion beam generating system, in particular for the pre-ionization of gas lasers, for example of the TE type. In that case as well, there is a double-grid configuration in the path of the electron beam that is generated, with one grid being a perforated anode and the other an accelerator grid that is spaced apart therefrom. As has already been explained with reference to U.S. Pat. No. 3,970,892, the double-grid configuration is relatively costly from the electrical and mechanical viewpoints. Even if the grid is extremely reliable, it represents an obstacle for the electron beam. Closely related thereto is the fact that in the version as an electron-beam generating system, the target foil and the target retaining wall that holds it are at a high positive potential (150 kV) and the metal housing that encloses the electron-beam generating system is also at that high positive potential.

It is accordingly an object of the invention to provide a plasma x-ray tube, in particular for x-ray preionizing of gas lasers, and an electron gun using the plasma x-ray tube, which overcome the hereinafore-mentioned disadvantages of the heretofore-known devices of this general type, which create a plasma X-ray tube for generating an electron beam and for converting the electron beam into X-ray radiation on an X-ray target of the plasma X-ray tube, in which the costly double-grid configuration has been avoided and which offer the possibility of connecting the outer metal housing of the plasma X-ray tube to ground. In particular, there is the problem of creating a plasma X-ray tube of the type described in the introduction hereto which, in comparison to field emission tubes, provides for a greatly extended service life and with which high electron flow densities can be produced with a large-area radiation cross section, in particular for X-ray pre-ionization of gas lasers, and especially for pulse operation, with sufficiently high charge carrier densities being available in the discharge volumes of the plasma X-ray tube. In addition, the plasma X-ray tube according to the present invention is to be suitable for pulse operation in TE-type (transversely excited) lasers, and primarily for excimer lasers.

With the foregoing and other objects in view there is provided, in accordance with the invention, a plasma X-ray tube for generating an electron beam with a high electron flow density and for converting the electron beam into X-ray radiation, comprising a gas-tight housing having a target-retaining wall with an inner surface, a cathode-retaining wall being disposed opposite and spaced apart from the target-retaining wall, lateral connecting walls, said target-retaining wall being metallic at least on its inner surface; a working gas, such as an ionizable gas or a gas mixture, disposed in the housing under a vacuum; a metal wall configuration in the form of a hollow cathode emitting the electron beam, partially enclosing a plasma space and defining a remaining interior space in the housing, the hollow cathode having a cathode base, at least two wall projections projecting from the cathode base and an open side, the open side and the cathode base facing the target-retaining wall and defining a given surface area of the target-retaining wall lying in the projection of the cathode base, and the hollow cathode having a high-voltage potential being negative enough to form an accelerator cathode for secondary electrons being driven off the hollow cathode by ion bombardment; an X-ray target gas-tightly covering the given surface area of the target-retaining wall and being exposed to the electron beam for converting the electron beam into X-ray radiation; the target-retaining wall having additional metal means for delimiting the plasma space and screening off the plasma space from the remaining interior space in conjunction with the hollow cathode, the target-retaining wall and the hollow cathode having a safety distance therebetween defining a gap through which the plasma space communicates with the remaining interior space; and at least one starting electrode in the form of a thin wire protruding into the plasma space for receiving a potential being positive relative to the hollow cathode and to the other metallic parts within the interior of said housing for generating a starting charge carrier cloud initiating a glow discharge within the plasma space.

In accordance with another feature of the invention, there are provided means for supplying electricity to the hollow cathode and for holding the hollow cathode on the cathode-retaining wall at safety distances from the surrounding housing walls lying beyond a flashover distance range, the supplying and holding means including an electrically insulating, gas-tight high voltage conductor lead-through and an electrically conductive cathode carrier for feeding high voltage and power to the hollow cathode.

In accordance with a further feature of the invention, the additional metal means for delimiting the plasma space include at least two metal electrode wall sections projecting from the target-retaining wall toward the at least two wall projections of said hollow cathode while maintaining the safety distance.

In accordance with an added feature of the invention, the at least two metal electrode wall sections are anode wall sections each being aligned with a respective one of the at least two wall projections of said hollow cathode.

In accordance with an additional feature of the invention, the housing is formed of metal on all sides and is connected to ground potential.

In accordance with yet another feature of the invention, the housing has a substantially rectangular cross section and extends perpendicular to a line drawn from the cathode base to the X-ray target, and the hollow cathode is an elongated trough with a U-shaped cross section conforming to the shape of the housing.

In accordance with yet a further feature of the invention, the working gas is under a pressure in the range of a fine vacuum.

In accordance with yet an added feature of the invention, the working gas is under a pressure in a range of from 1 to 100 Pa, corresponding to from $10^{-2}$ to 1 mbar.

In accordance with yet an additional feature of the invention, the working gas is He.

In accordance with again another feature of the invention, the working gas is an ionizable gas selected from the group consisting of $H_2$, Ne and Ar.

In accordance with again a further feature of the invention, the working gas is a gas mixture containing at least two ionizable gases selected from the group consisting of $H_2$, Ne and Ar.

In accordance with again an added feature of the invention, the hollow cathode and optionally the housing are at least partly formed of aluminum.

In accordance with again an additional feature of the invention, the hollow cathode and optionally the housing are at least partly formed of nickel.

In accordance with still another feature of the invention, the hollow cathode and optionally the housing have aluminum walls with inner surfaces being coated with nickel.

In accordance with still a further feature of the invention, the target-retaining wall has a window opening formed therein, and the X-ray target has a foil formed of a material of a higher atomic number Z, such as gold or uranium, covering the window opening and being gas-tightly joined to the target-retaining wall.

In accordance with still an added feature of the invention, the target-retaining wall has a window opening formed therein, and the X-ray target has a foil coated with a material of a higher atomic number Z, such as gold or uranium, covering the window opening and being gas-tightly joined to the target-retaining wall.

In accordance with still an additional feature of the invention, there is provided a gas laser, the plasma X-ray tube being means for X-ray pre-ionizing the gas laser.

U.S. Pat. No. 3,588,565 discloses a plasma tube for producing electron beams, which includes a gas-tight housing, a metal wall configuration in the form of a hollow cathode and additional metal means of a target-retaining wall for delimiting a plasma space and screening off the plasma space from a remaining interior space in conjunction with the hollow cathode. However, the operating pressure disclosed in that document is unclear (a range between $5 \times 10^{14}$ and $5 \times 10^{12}$ mmHg is disclosed, which would mean a range of from several to 100 Gigabars). This would not work, since the foil of the escape window cannot withstand such a pressure. If the pressure prescriptions are interpreted as $5 \times 10^{-14}$ to $5 \times 10^{-12}$ mmHg, that would mean pressure values of approximately $6 \times 10^{-14}$ to $6 \times 10^{-12}$ mbar. Plasma X-ray tubes of the type dealt with in the invention would not be operative in such an extreme vacuum, since they operate in a pressure range of a moderate vacuum of approximately 1 to $10^{-3}$ mbar.

IEEE Journal of Quantum Electronics, Vol. QE-10, No. 2, Feb. 1974, pages 213 to 218, discloses a two-chamber ion tube for producing an electron beam of high beam density for the purpose of pre-ionizing excimer lasers, from which there is also known an ignition wire or starter electrode. That known two-chamber ion tube works with an acceleration grid between the acceleration cathode on one side and the ignition wire and the electron beam-transparent foil on the other side. In contrast, the subject of the invention does not require such an acceleration grid.

In particular, TE (transversely excited) lasers are suitable as gas lasers. These are also known by the previous designation TEA (transversely excited atmospheric pressure) lasers. The last-named type is the preferred version for excimer lasers.

In accordance with another feature of the invention, the plasma X-ray tube is used as a pre-ionization system for an excimer laser. Such lasers that radiate in the ultraviolet range are described in greater detail, for example, in the article "Rare Gas Halide Lasers" by J. J. Ewing in Physics Today, May, 1978, pp. 32-39. Excimers are short-lived molecules that exist only in the excited state or which have a very weakly bound or dissociated basic state. Typical excimers are noble gas halogens such as ArF, KrF and XeCl, for example. By initiating a rapid gas discharge, the above excimers (also referred to as exciplexes) are formed by electron shock in a mixture of noble gas to which fluorine and a buffer gas such as helium have possibly been added. Coherent light is emitted upon transition to the base state. Since the base state is depopulated very rapidly (thermally) or a genuine base state for the molecule does not exist, it is simple to achieve the population inversion that is required for laser emission.

In accordance with a further feature of the invention, the plasma X-ray tubes are particularly pulse driven during the use of plasma X-ray tubes according to the present invention for the X-ray pre-ionization of gas lasers. This is because with them X-ray pulses in the range between 50 and 100 ns FWHM (time duration at half maximum) can be achieved at relatively short pulse rise and pulse decay times. However, in principle, continuous operation (cw) is possible for the pre-ionization of $CO_2$ continuous-wave lasers.

In accordance with an added feature of the invention, the plasma X-ray tube is used as an electron gun, with a foil that is suitably electron-beam permeable and covers the window opening in the target retaining wall. This further advantageous use only entails slight modification of the object of the present invention. For this purpose, for example, aluminum foils of a thickness in the order of 0.02 mm are used, with these foils being appropriately supported by a highly permeable supporting grid or mesh. Plastic foils of polyimide that are, for example, 0.01 mm thick and are metallized on both sides by a metal such as aluminum that is permeable to electrons, are also suitable for this purpose.

The advantages that can be achieved by the present invention are primarily seen in the high intensity of the X-ray retarding radiation and in the good homogeneity of the radiation distribution, even when one considers the absorption ratios in the X-ray window and in the laser gas, so that a good pre-ionization density can be achieved. The plasma X-ray tube according to the present invention operates according to the principle of electron generation by secondary electron emission at the hollow cathode. This hollow cathode also serves simultaneously as the accelerator cathode. It is preceded by an acceleration chamber of a length d in the direction in which the electrons are radiated. The accelerator chamber is preceded by the plasma space. The plasma is produced by a gas discharge at low gas pressure, preferably of a few Pa. The starting electrode is a thin wire that is preferably stretched along the longitudinal axis of the X-ray tube. The processes of plasma generation, ion extraction, and secondary electron acceleration take place in a single chamber, i.e., the plasma space and accelerator chamber are not separated from each other by a double-grid or single-grid configuration. For this reason, one can designate the plasma X-ray tube according to the present invention as a single-chamber ion tube, in contrast to the structural principle of the two-chamber ion tube.

The accelerator voltage is applied directly to a plasma. Generation of the low-pressure plasma is effected by triggering a gas discharge at least at one starting electrode, as discussed above. When a positive voltage is applied, an electrical field forms around the starting electrode, and under its influence, because of the ambient radiation, existing electrons are forced onto a long path and thus ionize gas atoms. Electron avalanches form and lead to initiation of the wire discharge. The resulting low-pressure plasma has the property of screening off the powerful field of the hollow cathode. The negative electrode potential attracts positive ions and repels electrons. An area of high ion density results in the vicinity of the inner surface of the hollow cathode. The space discharge of the positive ions neutralizes the field of the hollow cathode and delimits it from the plasma space. The density of the ion flow to the hollow cathode is thus independent of the voltage that is applied. The number of ions that pass through the space-charge area into the acceleration field of the accelerator cathode (cathode base) is determined by the flow density in the wire discharge. The flow to the hollow cathode obeys the space-charge law, so that the distance between the accelerator cathode (cathode base) and the space-charge limits result from the Langmuir-Child Law, which applies to plan-parallel electrode configurations:

$$d \sim \frac{V^{\frac{3}{4}}}{j+^{\frac{1}{2}}}$$

$j+$ = ion-flow density
$V$ = potential differential along the accelerator section The acceleration processes of ions and secondary electrons take place within this area d in this single-chamber ion tube.

The cross-sectional form of the hollow cathode, with its minimum of two wall projections and the opposite additional plasma-space delimiting means in the form of at least two corresponding wall projections, is particularly important. Both the wall projections of the hollow cathode and the wall sections of the target-retaining walls that are aligned with them are rounded over on their surfaces that face each other, so that field-strength peaks are avoided. The wall projections or wall sections can be respectively regarded as electrodes or electrode beads that correspond to each other. Their geometries (shape and placement or configuration) ensure that the low-pressure plasma is contained in the space between the electrodes. An increase of the charge-carrier concentration between the hollow cathode and the outer metal housing (which would increase the probability of an unwanted flashover) is prevented thereby. Furthermore, the geometry ensures that the field curve in the vicinity of the hollow cathode assumes a shape in such a way that parasitic electron flows to the metal side walls of the X-ray tube are avoided.

This means that the housing can be formed of metal on all sides and connected to ground, which represents a considerable advantage. Apart from cost reduction that results from a simpler construction, in contrast to the construction of a two-chamber ion tube, the plasma tube according to the present invention is characterized by a greater degree of efficiency (avoidance of radiation intensity losses at the grid) and by the savings resulting from the fact that it does not incorporate a separate high-voltage power supply, because there is no provision for a discharge between a hollow cathode anode and the hollow cathode.

Other features which are considered as characteristic for the invention are set forth in the appended claims.

Although the invention is illustrated and described herein as embodied in a plasma x-ray tube, in particular for x-ray preionizing of gas lasers, and an electron gun using the plasma x-ray tube, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
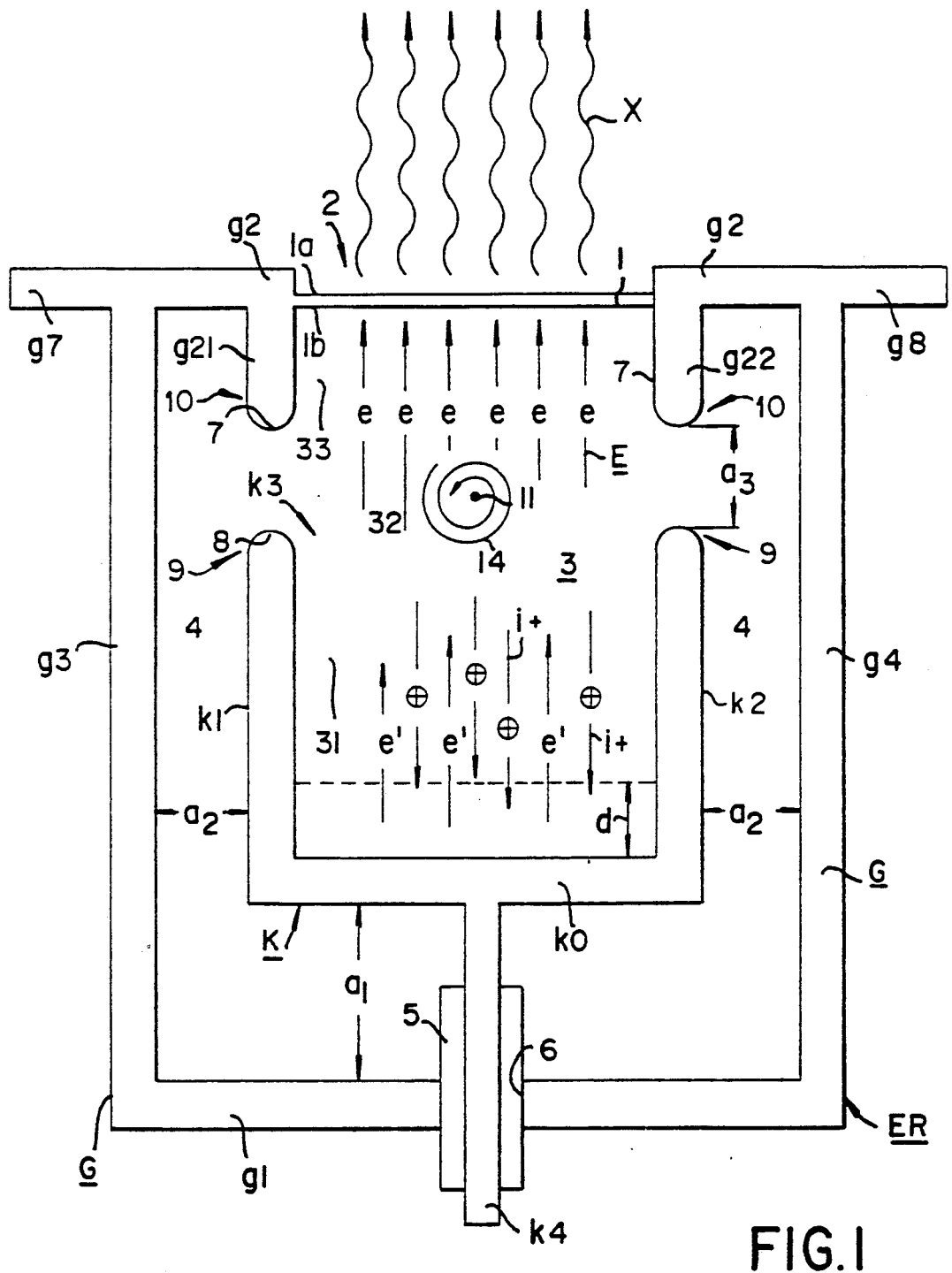
FIG. 1 is a diagrammatic, cross-sectional view of a plasma X-ray tube of the "single chamber ion tube" type according to the present invention, which can have a length of one-half meter (perpendicular to the plane of the paper), for example.
Figure 2:
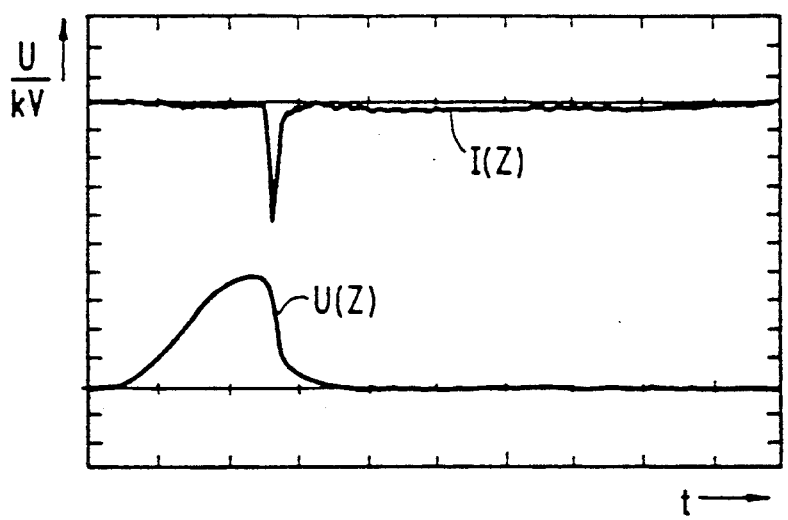
FIG. 2 is a diagram in which the curve of the voltage U(Z) on the starting or igniting electrode and of the starting-electrode current I(Z) is shown above a time axis t, in which there is no special scale for the starting electrode flow, and it can be in amperes or in the range of hundreds of amperes, depending on the output of the single-chamber ion tube.
Figure 3:
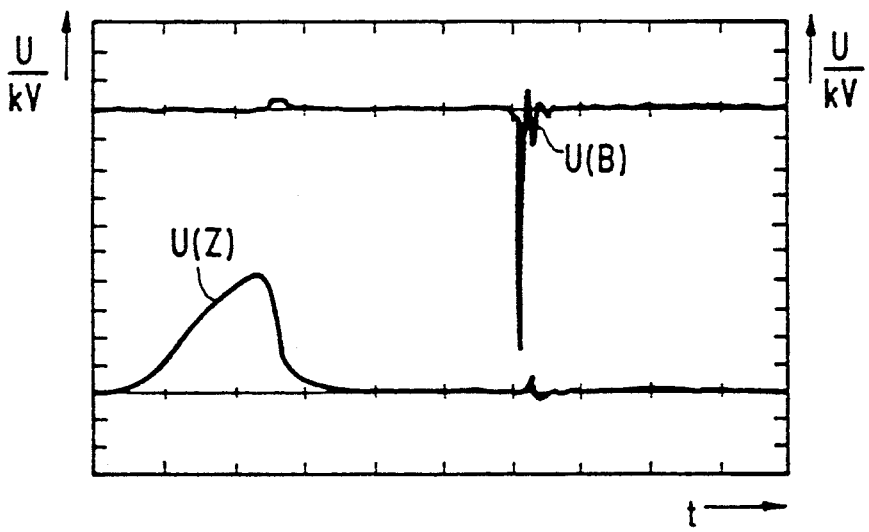
Figure 4:
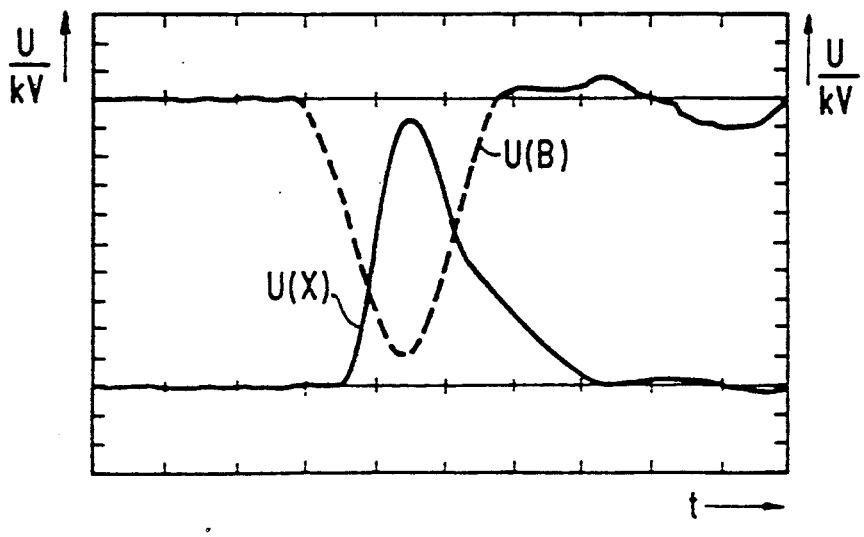
Figure 5:
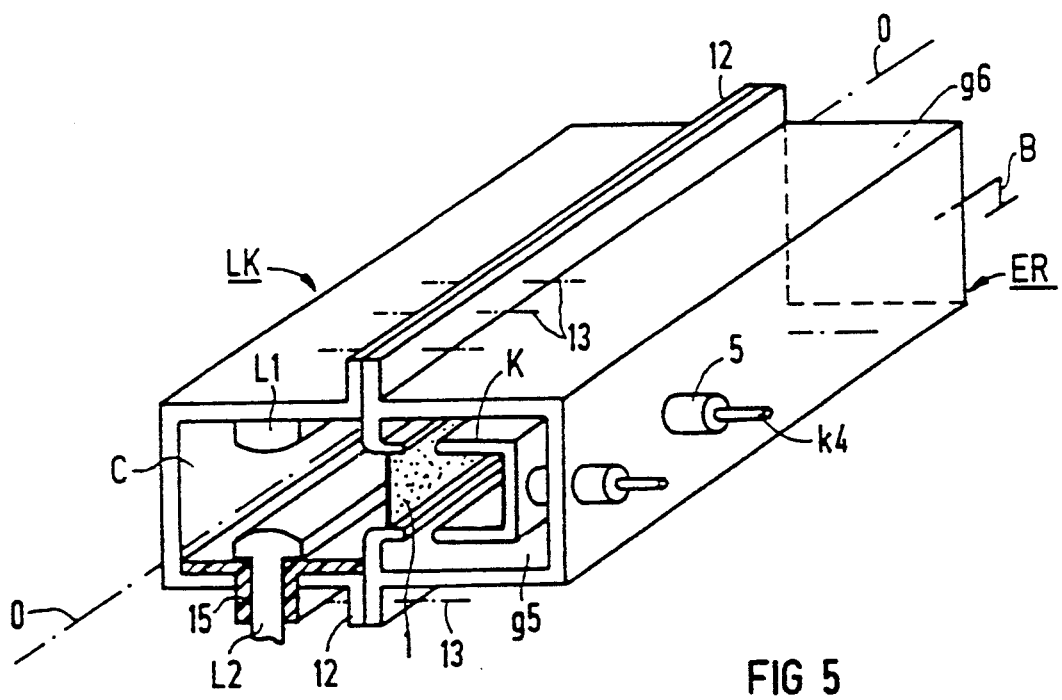

FIG. 3 is a diagram corresponding to FIG. 2, showing the curve of the starting voltage U(Z) and of the pulse of the accelerator voltage U(B) over the time axis t, with the voltage U being once again shown in the ordinate axis in kV; FIG. 4 is another diagram corresponding to FIG. 2 (with U in kV on the ordinate axis, and the abscissa axis being the time axis), showing the curve of the accelerator voltage U(B) and of the X-ray amplitude U(X) during emission of an X-ray pulse; and FIG. 5 is a fragmentary, perspective view of a plasma X-ray tube as seen in FIG. 1, being incorporated on the laser chamber of a TE-type gas laser, in particular an excimer laser. Referring now to the figures of the drawings in detail and first, particularly, to FIGS. 1 and 5 thereof, there is seen a plasma X-ray tube which operates as a single-chamber ion tube, which is shown in simplified form as a tube and which bears an overall reference symbol ER. The plasma X-ray tube is used to generate an electron beam E, having electron tracks which are symbolized by arrows 3, and to convert the electron beam E into X-ray radiation X, having individual photon tracks or wave trains which are symbolized as wavy arrows. A hollow cathode, which bears the overall reference symbol K, has a cathode base k0. The conversion of the electron tracks of the beam E into the X-ray radiation X is effected by means of an X-ray target 1. The target 1 forms a gas-tight cover of a surface area of a target retaining wall g2 of the tube ER, which lies in the projection of the cathode base k0 and is exposed to the electron beams E that flow from the hollow cathode K.

The tube ER is formed of a gas-tight housing G with a cathode retaining wall g1 as well as the previously mentioned target retaining wall g2, which are spaced apart from each other. Besides the retaining walls g1 and g2, the housing G is completed with the addition of lateral connecting walls g3 and g4, as well as end walls g5 and g6 as can be seen from FIG. 5, wherein the end wall g5 is illustrated as if it were transparent. The housing G is preferably made of metal on all sides and is connected to ground potential since this provides good shielding to the outside and minimizes insulation costs. For this reason, the walls g1 to g6 are preferably formed of solid metal, for example aluminum. The walls can be coated on the inside with nickel. Fundamentally, even if this is not v̤ ⁻ ⋅ ⋅ ⋅ ⋅ ⋅⋅ t⁻e shielding standpoint, the housing could be ⋅ ⋅ ⋅⋅⋅⋅⋅ tha⋅ is metallized on the inside, in other ·w⋅ .ds clad with suitable metal foil or treated with vaporized metal. This also applies to the target retaining wall g2.

The foil for the X-ray target 1 covers a window 2 in the target retaining wall g2 and is hermetically connected to the wall g2. The foil or X-ray target is preferably formed of a material of a higher classification number Z, i.e., gold or uranium, or it is formed of a carrier foil 1a of material that is radiation-permeable, such as aluminum that is coated with a coating 1b of the above-mentioned metal of a higher classification number (gold or uranium). If either the foil 1 or the carrier foil 1a is very thin, then they can be supported on a non-illustrated supportive grid, on which they are applied. Such an X-ray target 1 must seal the vacuum in the interior of the housing G against atmospheric pressure or, in the case of a laser as seen in FIG. 5, against an internal pressure of a few bar within the laser. The depth of the interior space of the housing G is defined by the distance between the two walls g1 and g2, the width of the housing is defined by the distance between the lateral walls g3 and g4, and the length of the housing G of the tube ER is defined by the distance between the wall surfaces g5 and g6 seen in FIG. 5. The target retaining wall g2 is provided with flange-like projections g7 and g8 on both its long sides, to be used in the event that it is to be installed on a laser chamber as seen in FIG. 5.

The tube ER also incorporates a system of metal walls which form the hollow cathode K in the interior of the housing G. The walls of the hollow cathode K partially enclose a plasma space 3. At least two projecting walls k1, k2 are provided on the cathode base k0 in such a way that an open side k3 of the hollow cathode K and its base k0 face the X-ray target 1 of the target retaining wall g2. A negative high-voltage potential, which is 100 kV in this embodiment, is connected to the hollow cathode K in such a way that it forms an accelerator cathode for secondary electrons e' driven off it by ion bombardment. The tracks described by the secondary electrons e' during their acceleration away from the hollow cathode K in the direction of the X-ray target 1 are symbolized in simplified form by arrows, as are the tracks of positive ions i+ that are attracted by the negative potential of the hollow cathode K and accelerated in the direction of the hollow cathode K, which they strike and from which they then strike off the secondary electrons e'. The hollow cathode K is shaped like an open trough that is closed off at its ends by non-illustrated cathode wall surfaces. The hollow cathode K is thus formed of a base wall k0, two long walls k1, k2, and the wall surfaces.

To this end, the plasma space 3 that is situated between the hollow cathode K and the X-ray target 1, and the remaining interior spaces or chamber spaces of the housing, each of which is situated between one of the wall projections k1 or k2 and the respective opposite connecting wall g3 or g4, is filled with a working gas at a pressure in the range of a fine vacuum ($1$–$10^{-3}$ mbar). Helium is the preferred working gas, although $H_2$, Ne or Ar are also suitable for this purpose. It is also possible to work with a mixture of at least two or more of these gases. A preferred pressure range for the working gas is between 1 and 100 Pa, corresponding to $10^{-2}$ to 1 mbar. In the present embodiment, work is perfomed at a helium pressure of between 2 and 10 Pa.

Suitable means i⋅ t⁻e form of an electrically insulating, gas-tight high v⋅ ⁻⋅ ⋅onductor lead-throug⋅ 5 for an electrically (⋅⋅ ⋅u⋅..⋅ng c⋅⋅⋅ode ⋅⋅arrier k4 that serves as a high voi⋅age and power supply for the hollow cathode K, are provided as an electrical supply and for holding the cathode K on the cathode retaining wall g1, while maintaining safety distances $a_1$, $a_2$ and $a_3$ from the surrounding housing walls g1, g3–g4 and g2 that lie outside the flashover distance. The conductor lead-through 5 is formed of a hollow, cylindrical sleeve of high voltage-proof insulating material, which surrounds a cylindrical shaft of the cathode carrier k4 in such a way as to be gas-tight, and which is inserted in a corresponding bore 6 in the cathode retaining wall g1 so as to form a gas-tight fit. As is shown in greater detail in FIG. 5, the cylindrical shafts for the cathode carriers k4 are spaced evenly along the length of the hollow cathode K and are each held in corresponding conductor lead-throughs 5 so as to have a gas-tight fit. The preferred embodiment of the housing G can be seen from FIG. 1 in conjunction with FIG. 5. The housing has a rectangular cross-section and extends lengthwise perpendicular to a line from the cathode base kO to the X-ray target 1. According to the preferred embodiment, in conformance to this housing shape, the hollow cathode K is in the form of an elongated, closed trough with a U-shaped cross-section. The two projecting walls k1, k2 enclose a plasma space 31 on three sides and there are non-illustrated wall surface sections at the ends, as discussed above.

Additional means g21, g22 are provided in the illustrated embodiment for defining the plasma space 3, which are in the form of metal electrode wall sections that project from the target retaining wall g2 in the direction of the two projecting walls k1, k2 of the hollow cathode K while maintaining the safety distance $a_3$. Like the wall projections k1, k2, the electrode wall sections g21, g22 extend essentially along the whole length of the plasma space 3 and a remaining space 4 in the interior of the chamber of the tube ER, as is seen in FIG. 5. As is shown in FIG. 1, the electrode wall sections g21, g22 are aligned in pairs with the wall projections k1, k2 of the hollow cathode K. The electrode wall sections g21, g22 are provided with rounded sections 7, 8 which face each other. The rounded sections serve to flatten out field-strength spikes or to reduce corresponding field-strength gradients, and thereby help to avoid undesired slide-spark discharges. The electrode wall sections g21, g22 and wall surface sections that cannot be seen, enclose a plasma space 33 on five sides. An inter-electrode space in the form of an additional plasma space 32 is located between electrode heads or beads which face each other and have been given reference numerals 9, 10. At least one starting or igniting electrode 11 in the form of a thin wire passes through the additional plasma space 32. The diameter of the wire starting or igniting electrode 11 may amount to 0.1 mm, for example. The wire diameter may not be made too large, so as to ensure a sufficiently large field strength and its potential is positive, relative to the hollow electrode K, and amounts to from 500 V up to a few kV, for example. At these values (of the diameter and voltage), Paschen's Law has to be considered, exactly as when dimensioning the distances $a_1$, $a_2$, and $a_3$. As is known, this law states that the spark voltage for a spark flashover between two opposite electrodes that are separated by a distance d depends on the product of this distance d and the gas pressure p. Paschen's Law states that: The sparking potential between electrodes in a gas depends on the length of the spark gap and the pressure of the gas in such a way that it is directly proportional to the mass of gas between the two electrodes, i.e., the sparking potential is a function of the pressure times the density of the gas (see Van Nostrand's Scientific Encyclopedia). According to the present embodiment, the tube ER operates in a range to the left of the so-called Paschen minimum, so that no undesired spark flashovers can occur.

Thus, the electrode wall sections g21 and g22 form the additional means for defining the plasma space that screens off the plasma space 3 from the remaining interior space 4 in the housing in conjunction with the hollow cathode K, with the plasma space 3 communicating with the remaining interior space 4 within the housing through a gap that is governed by the safety distance $a_3$. The hollow cathode K is also preferably formed of aluminum, which can be additionally coated on its inside with nickel or a nickel foil. However, in the same way as the housing G, it can be entirely formed of nickel. The safety distance of the hollow cathode K must naturally be provided opposite the end walls g5, g6 of the housing, which is seen in FIG. 5 but is not shown in greater detail. The cathode carriers k4 can be cylindrical pins or studs that are secured in the cathode base kO by being screwed in or by similar means. Flange connection bolts for gas-tightly connecting the flange-like projections g7, g8 with corresponding matching flanges 12 of an elongated laser chamber LK, have been give reference numeral 13 in FIG. 5.

The tube ER that is shown is preferably pulse driven. This results of necessity if it is used for the X-ray pre-ionization of a gas layer that is similarly pulse driven. The current density of the pulsed electron beam E, having a retardation at the X-ray target 1 which leads to the emission of the X-ray radiation X, typically amounts to from 5 to 10 A/cm$^2$ at a voltage of 60 to 120 kV maximum. The formation of a charge carrier avalanche is initiated by application of a starting or igniting voltage pulse to the starting or igniting electrode 11, which is clamped between the two wall surfaces g5, g6 by means of suitable lead-throughs that are high voltage-proof. An electrical field is formed around the wire starting or igniting electrode 11. Under the influence of the electrical field and because of the ambient radiation, the electrons that are present are forced onto a long path in the form of spiral tracks 14 and thus ionize gas atoms when they collide with them. Electron avalanches form, and these lead to initiation of the wire discharge, with the formation of a low-pressure plasma. The low-pressure plasma is formed of positive ions and electrons in the form a space-charge cloud, with the formation of charge carriers being further supported by the fact that the positive ions, which strike the projecting electrode beads 9, 10, strike other electrons (secondary electrons) off the projecting electrode beads 9, and these move once again to the starting or igniting electrode 11 in spiral tracks, and so on. The main component of the positive ions is extracted from the low-pressure plasma in the direction of the greatest field gradient, i.e., as is shown by the arrows i+, towards the hollow cathode K and is accelerated in this direction. If they strike the inner surface of the hollow cathode K, they strike secondary electrons therefrom. As has been discussed above, the low-pressure plasma has the property of shielding the powerful field of the hollow cathode K. The negative electrode potential of the cathode base attracts the positive ions and repulses electrons. There is thus an area of high ion density in the vicinity of the hollow electrode. The space charge of the positive ions i+ practically neutralizes the field of the hollow cathode and delimits it from the plasma space. The density of the ion flow i+ to the hollow cathode K is practically independent of the voltage that is applied. The number of ions that pass through the space-charge area into the acceleration field of the cathode base kO is determined by the flow density of the wire discharge of the starting or igniting electrode 11. The distance d that exists between the hollow cathode K and the space-charge limit of the low-pressure plasma has been inserted as an example, and greatly simplified, in order to clarify further processes. In reality, this is a curved line or a curved boundary surface that is not fixed. The acceleration of the positive ions i+ in the direction of the hollow cathode K and of the secondary electrons away from the hollow cathode K takes place in this area. The accelerated secondary electrons e' move at such a speed that they fly through the low-pressure plasma within the plasma space 3 and then strike the X-ray target 1 as the electron beam E, from the outer side of which the X-ray radiation is given off. The intensity and spectral energy distribution of the X-ray (retarding) radiation are selected with the objective of sufficient pre-ionization density in the laser gas if the tube ER is to be used for this purpose.

FIG. 2 shows the curve of the voltage pulse U(Z) and of the current pulse I(Z) at the starting or igniting electrode 11. The start delay time is dependent on field strength and gas pressure.

The time interval between the starting or igniting electrode wire discharge shown by the curve U(Z), and the application of the accelerator voltage U(B) can be freely set by an electronic control system. However, the exact time for the use of the accelerator voltage U(B) is closely related with the starting time of the laser discharge if the tube is to be used for this purpose. At a typical accelerator voltage for the electron beam E of between 60 and 120 kV, the half-value width of the X-ray pulse shown by the X-ray amplitude U(X) in FIG. 4, amounts to approximately 50 to 100 ns FWHM (duration at half maximum). In FIG. 4, the curve U(B) once again shows the accelerator voltage. Pulsed operation of the tube makes pre-ionization possible within the prescribed time window prior to initiation of the main discharge between laser electrodes L1, L2 of the laser chamber LK seen in FIG. 5, on which the tube ER is assembled according to a preferred application. The laser shown in FIG. 5 is preferably an excimer laser of the TE type, and its optimum axis has been given reference symbol o—o. Mirrors that define the length of the laser resonator and are disposed at the ends of a laser cavity C, have been omitted for purposes of clarity.

The laser electrode L1 is at ground. The grounding of the metal housing for the laser chamber LK and of the metal housing of the plasma X-ray tube ER connected with it is indicated at reference symbol B. The laser electrode L2 is the "high" electrode, i.e., it is connected to high-voltage potential and for this reason it is secured, while being insulated, to the housing of the laser chamber LK by means of a high-voltage insulator 15 so as to be gas-tight and high voltage-proof. The latter is also configured as a lead-through and as cladding.

By using the plasma X-ray tube according to the present invention, it is possible to influence the amplitude of the electron flow for the electron beam and the accelerator vol... U(B) by varying the gas pressure and the p... the latter depending on the starting elec... .rrent. The same applies for variation of the distance (a₃) between the electrode wall sections or heads or beads 9, 10 that face each other and their dimensions, in order to match the tube resistance, which results during acceleration of the charge carriers, to the internal resistance of the particular HS (high voltage) generator. The preferred electrode material, which is aluminum, is characterized by a low tendency to sputter and a great ability to emit secondary electrons. Examples of an application for the use of the plasma X-ray tube discussed herein as an electron gun are electron beam pumped lasers, annealing processes in semiconductor technology, and switching technique pulsed power applications.

According to another non-illustrated embodiment, which is a modification of the example shown in FIG. 5, the tube can also be installed above the grounded laser electrode L1, which must then be formed of a material that permits the passage of X-rays, so that the X-rays can then enter the laser discharge volumes between the laser electrodes L1, L2 through this electrode.

We claim:

1. Plasma X-ray tube for generating an electron beam with a high electron flow density and for converting the electron beam into X-ray radiation, comprising:
   a) a gas-tight housing having a target-retaining wall with an inner surface, a cathode-retaining wall being disposed opposite and spaced apart from said target-retaining wall, lateral connecting walls, said target-retaining wall being matallic at least on its inner surface;
   b) a working gas disposed in said housing under a vacuum;
   c) a metal wall configuration in the form of a hollow cathode emitting the electron beam, partially enclosing a plasma space and defining a remaining interior space in said housing, said hollow cathode having a cathode base, at least two wall projections projecting from said cathode base and an open side, said open side and said cathode base facing said target-retaining wall and defining a given surface area of said target-retaining wall lying in the projection of said cathode base, and said hollow cathode having a high-voltage potential being negative enough to form an accelerator cathode for secondary electrons being driven off said hollow cathode by ion bombardment;
   d) an X-ray target gas-tightly covering said given surface area of said target-retaining wall and being exposed to the electron beam for converting the electron beam into X-ray radiation;
   e) said target-retaining wall having additional metal means for delimiting said plasma space and screening off said plasma space from said remaining interior space in conjunction with said hollow cathode, said target-retaining wall and said hollow cathode having a safety distance therebetween defining a gap through which said plasma space communicates with said remaining interior space; and
   f) at least one igniting electrode in the form of a thin wire protruding into said plasma space for receiving a potential being positive relative to said hollow cathode and to the other metallic parts within the interior of said housing for generating an igniting charge carrier cloud initiating a glow discharge within said plasma space.

2. Plasma X-ray tube according to claim 1, wherein said working gas is an ionizable gas.

3. Plasma X-ray tube according to claim 1, wh... said working gas is a gas mixture.

4. Plasma X-ray tube according to claim 1, including means for supplying electricity to said hollow cathode and for holding said hollow cathode on said cathode-retaining wall at safety distances from said gas-tight housing walls lying beyond a flashover distance range, said supplying and holding means including an electrically insulating, gas-tight high voltage conductor lead-through and an electrically conductive cathode carrier for feeding high voltage and power to said hollow cathode.

5. Plasma X-ray tube according to claim 1, wherein said additional metal means for delimiting said plasma space include at least two metal electrode wall sections projecting from said target-retaining wall toward said at least two wall projections of said hollow cathode while maintaining said safety distance.

6. Plasma X-ray tube according to claim 5, wherein said at least two metal electrode wall sections are anode wall sections each being aligned with a respective one of said at least two wall projections of said hollow cathode.

7. Plasma X-ray tube according to claim 1, wherein said housing is formed of metal on all sides and is connected to ground potential.

8. Plasma X-ray tube according to claim 1, wherein said housing has a substantially rectangular cross section and extends perpendicular to a line drawn from said cathode base to said X-ray target, and said hollow cathode is an elongated trough with a U-shaped cross section conforming to the shape of said housing.

9. Plasma X-ray tube according to claim 1, wherein said working gas is under a pressure in the range of a fine vacuum.

10. Plasma X-ray tube according to claim 9, wherein said working gas is under a pressure in a range of from 1 to 100 Pa, corresponding to from $10^{-2}$ to 1 mbar.

11. Plasma X-ray tube according to claim 1, wherein said working gas is He.

12. Plasma X-ray tube according to claim 1, wherein said working gas is an ionizable gas selected from the group consisting of $H_2$, Ne and Ar.

13. Plasma X-ray tube according to claim 1, wherein said working gas is a gas mixture containing at least two ionizable gases selected from the group consisting of $H_2$, Ne and Ar.

14. Plasma X-ray tube according to claim 1, wherein said hollow cathode is at least partly formed of aluminum.

15. Plasma X-ray tube according to claim 14, wherein said housing is at least partly formed of aluminum.

16. Plasma X-ray tube according to claim 1, wherein said hollow cathode is at least partly formed of nickel.

17. Plasma X-ray tube according to claim 16, wherein said housing is at least partly formed of nickel.

18. Plasma X-ray tube according to claim 1, wherein said hollow cathode has aluminum walls with inner surfaces being coated with nickel.

19. Plasma X-ray tube according to claim 18, wherein said housing has aluminum walls with inner surfaces being coated with nickel.

20. Plasma X-ray tube according to claim 1, wherein said target-retaining wall has a window opening formed therein, and said X-ray target has a foil formed of a material of a high atomic number Z covering said window opening and being gas-tightly joined to said target-retaining wall.

21. Plasma X-ray tube according to claim 20, wherein said foil is formed of a material selected from the group consisting of gold and uranium.

22. Plasma X-ray tube according to claim 1, wherein said target-retaining wall has a window opening formed therein, and said X-ray target has a foil coated with a material of a higher atomic number Z covering said window opening and being gas-tightly joined to said target-retaining wall.

23. Plasma X-ray tube according to claim 22, wherein said foil is formed of a material selected from the group consisting of gold and uranium.

24. Plasma X-ray tube assembly for generating an electron beam with a high electron flow density and for converting the electron beam into X-ray radiation, comprising a plasma X-ray tube including:

a) a gas-tight housing having a target-retaining wall with an inner surface, a cathode-retaining wall being disposed opposite and spaced apart from said target-retaining wall, lateral connecting walls, said target-retaining wall being metallic least on its inner surface;

b) a working gas disposed in said housing under a vacuum;

c) a metal wall configuration in the form of a hollow cathode emitting the electron beam, partially enclosing a plasma space and defining a remaining interior space in said housing, said hollow cathode having a cathode base, at least two wall projections projecting from said cathode base and an open side, said open side and said cathode base facing said target-retaining wall and defining a given surface area of said target-retaining wall lying in the projection of said cathode base, and said hollow cathode having a high-voltage potential being negative enough to form an accelerator cathode for secondary electrons being driven off said hollow cathode by ion bombardment;

d) an X-ray target gas-tightly covering said given surface area of said target-retaining wall and being exposed to the electron beam for converting the electron beam into X-ray radiation;

e) said target-retaining wall having additional metal means for delimiting said plasma space and screening off said plasma space from said remaining interior space in conjunction with said hollow cathode, said target-retaining wall and said hollow cathode having a safety distance therebetween defining a gap through which said plasma space communicates with said remaining interior space; and f) at least one igniting electrode in the form of a thin wire protruding into said plasma space for receiving a potential being positive relative to said hollow cathode and to the other metallic parts within the interior of said housing for generating an igniting charge carrier cloud initiating a glow discharge within said plasma space.

25. Plasma X-ray tube assembly according to claim 1, including a gas laser, said plasma X-ray tube being means for X-ray pre-ionizing said gas laser.

26. Plasma X-ray tube assembly according to claim 1, including an excimer laser, said plasma X-ray tube being means for X-ray pre-ionizing said excimer laser.

27. Plasma X-ray tube assembly according to claim 1, including means for pulse operating said plasma X-ray tube.

28. Plasma X-ray tube assembly according to claim 1, wherein said plasma X-ray tube is an electron gun, said target-retaining wall has a window opening formed therein, and said target has an electron beam permeable foil covering said window opening and serving and an electron window.

29. Plasma X-ray tube for generating an electron beam with a high electron flow density and for converting the electron beam into X-ray radiation, comprising:
   a) a gas-tight housing having a target-retaining wall with an inner surface, other walls, said target-retaining wall being metallic at least on its inner surface;
   b) a working gas disposed in said housing under a vacuum;
   c) a hollow metal cathode emitting the electron beam, partially enclosing a plasma space and defining a remaining interior space in said housing, said hollow cathode having a cathode base and an open side facing said target-retaining wall, and said hollow cathode forming an accelerator cathode for secondary electrons being driven off said hollow cathode by ion bombardment;
   d) an X-ray target gas-tightly covering a surface portion of said target-retaining wall opposite said cathode base and being exposed to the electron beam for converting the electron beam into X-ray radiation;
   e) said target-retaining wall having additional metal means for delimiting said plasma space and screening off said plasma space from said remaining interior space in conjunction with said hollow cathode, said target-retaining wall and said hollow cathode having a safety distance therebetween defining a gap through which said plasma space communicates with said remaining interior space; and
   f) at least one igniting electrode protruding into said plasma space for receiving a potential being positive relative to said hollow cathode and to the other metallic parts within the interior of said housing for generating an igniting charge carrier cloud initiating a glow discharge within said plasma space.

* * * * *